(12) United States Patent
Krog et al.

(10) Patent No.: US 9,126,674 B2
(45) Date of Patent: Sep. 8, 2015

(54) BEAM

(75) Inventors: Lars Krog, Bristol (GB); Andrea Marasco, Madrid (ES); Stéphane Grihon, Toulouse (FR); Manuela Jürgens, Hamburg (DE); Gary Ryan, Hamburg (DE); Stuart Bates, Bristol (GB)

(73) Assignees: Airbus Operations Limited, Bristol (GB); Airbus Operations SL, Madrid (ES); Airbus Operations SAS, Toulouse (FR); Airbus Operations GmbH, Hamburg (DE)

( * ) Notice: Subject to any disclaimer, the term of this patent is extended or adjusted under 35 U.S.C. 154(b) by 229 days.

(21) Appl. No.: 13/805,439

(22) PCT Filed: Jul. 12, 2011

(86) PCT No.: PCT/EP2011/061835
§ 371 (c)(1),
(2), (4) Date: Dec. 19, 2012

(87) PCT Pub. No.: WO2012/007449
PCT Pub. Date: Jan. 19, 2012

(65) Prior Publication Data
US 2013/0273306 A1    Oct. 17, 2013

(30) Foreign Application Priority Data

Jul. 14, 2010   (GB) .................................. 1011842.0

(51) Int. Cl.
*B64C 1/18*    (2006.01)
*B32B 3/26*    (2006.01)
(Continued)

(52) U.S. Cl.
CPC . *B64C 1/18* (2013.01); *B64C 1/065* (2013.01); *Y10T 403/64* (2015.01); *Y10T 428/24008* (2015.01); *Y10T 428/24298* (2015.01)

(58) Field of Classification Search
CPC .................................... B64C 1/18; B64C 1/06
USPC ............ 428/99, 119, 131; 244/119; 52/650.1, 52/650.2
See application file for complete search history.

(56) References Cited

U.S. PATENT DOCUMENTS 4,479,621 A    10/1984  Bergholz
8,037,658 B2 * 10/2011  Kundel et al. .............. 52/651.01

FOREIGN PATENT DOCUMENTS

DE   10 2007 062111    7/2009
WO   WO 00/47839    8/2000
(Continued)

OTHER PUBLICATIONS

International Search Report for PCT/EP2011/061835, mailed Oct. 14, 2011.
(Continued)

*Primary Examiner* — Alexander Thomas
(74) *Attorney, Agent, or Firm* — Nixon & Vanderhye P.C.

(57) ABSTRACT

A beam (20) comprising first and second flanges (23, 24), the beam (20) having a first region (28, 30) extending between the flanges (23, 24) and a second region (26) extending between the flanges. The first region (28, 30) is designed to support an applied concentrated shear load and the second region (26) is designed to support a predominantly bending load. The first region comprises a fan-shaped truss comprising a hub (36) adjacent the first flange and a plurality of struts (37) which extend substantially radially from the hub (36), and the second region (26) comprises either a truss structure which is substantially regular in the longitudinal beam direction or a shear web. The beam may, for example, be used as a floor beam for an aircraft fuselage.

19 Claims, 3 Drawing Sheets

(51) Int. Cl.
*B32B 3/06* (2006.01)
*B64C 1/06* (2006.01)

(56) References Cited

FOREIGN PATENT DOCUMENTS

| WO | WO 2009/098098 | 8/2009 |
|----|----------------|--------|
| WO | WO 2009/112694 | 9/2009 |

OTHER PUBLICATIONS

Written Opinion for PCT/EP2011/061835, mailed Oct. 14, 2011.
Search Report for GB1011842.0 dated Nov. 10, 2010.
Dux, Concrete: Current Practices and Innovations Feb. 19, 2008, James Cook University, Truss Models in Concrete Beam Design, accessed Nov. 10, 2010, 14 pages.

\* cited by examiner

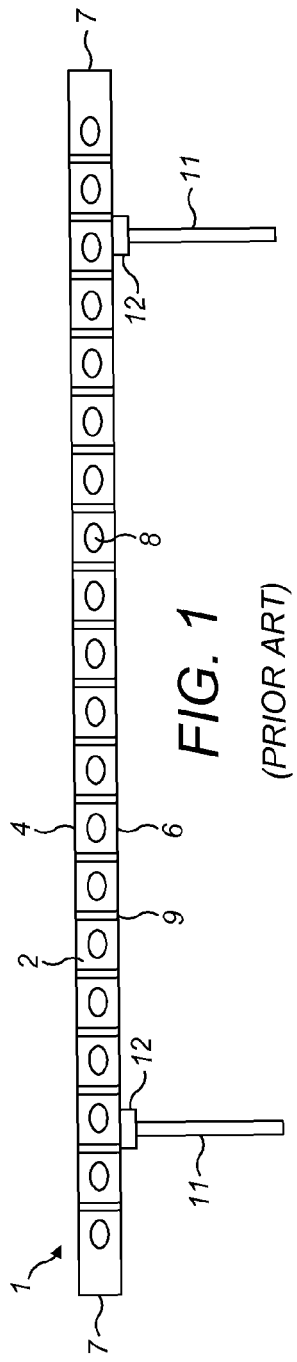
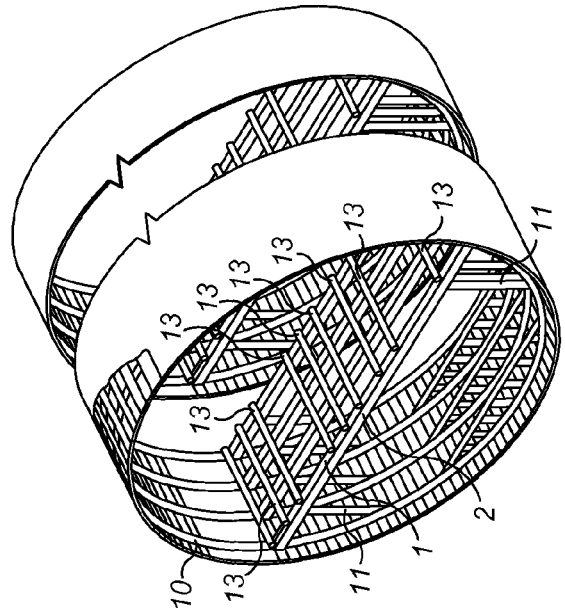
FIG. 1
(PRIOR ART)
FIG. 2
(PRIOR ART)

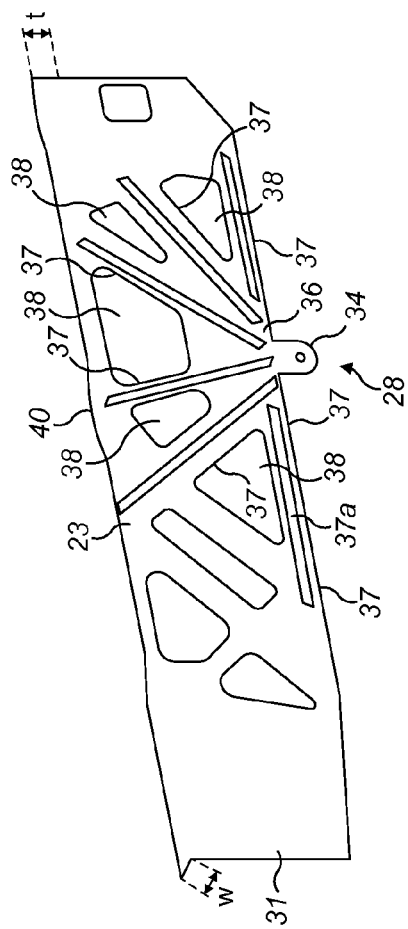
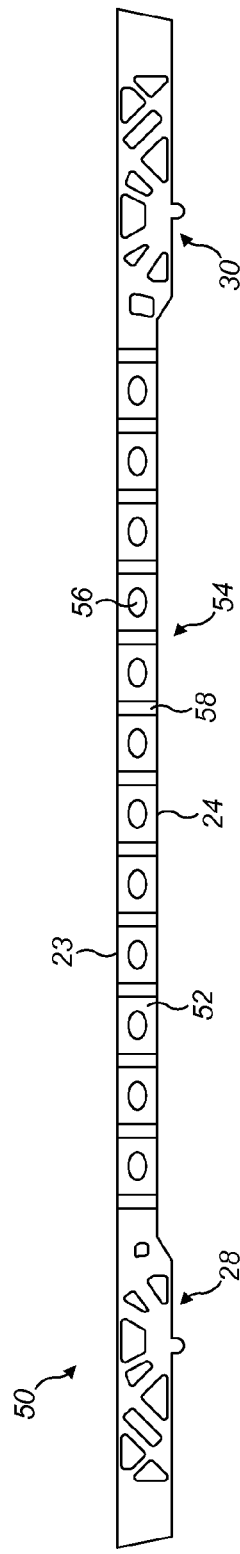
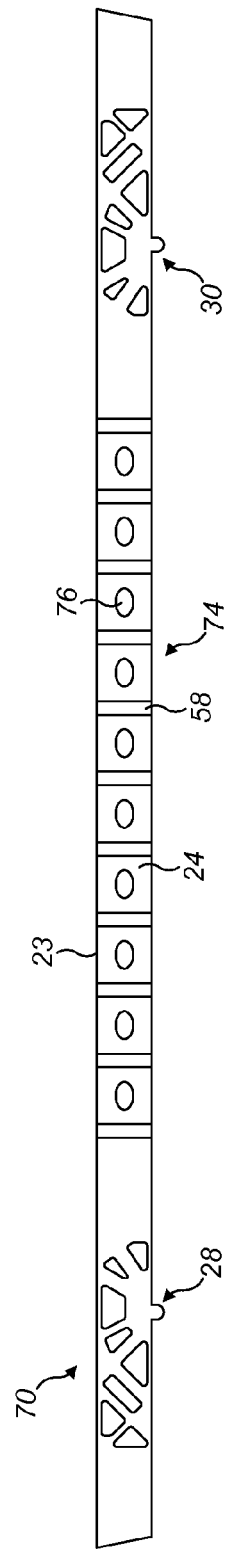

BEAM

This application is the U.S. national phase of International Application No. PCT/EP2011/061835 filed 12 Jul. 2011 which designated the U.S. and claims priority to GB Patent Application No. 1011842.0 filed 14 Jul. 2010, the entire contents of each of which are hereby incorporated by reference.

FIELD OF THE INVENTION

The present invention relates to a beam, a joint comprising a component joined to the beam and an aircraft comprising the beam.

BACKGROUND OF THE INVENTION

FIG. 1 illustrates a conventional floor beam 1 for an aircraft fuselage. The beam 1 comprises an I-section with a stiffened shear web 2 extending between upper and lower flanges 4, 6. The shear web 2 is provided with a regularly spaced series of identical oval weight-saving and system cut-outs 8. A number of stiffeners 9 are provided along the length of the web between the cut-outs to increase the amount of load which can be supported by the beam 1.

As most clearly seen in FIG. 2 ("Airframe Structural Design", by Michael C. Y. Niu, $2^{nd}$ Edition, Hong Kong Conmilit Press Ltd.), a number of these floor beams 1 typically extend across the width of the fuselage to support a fuselage floor. The ends 7 of each beam 1 are bolted to a respective fuselage frame 10. Each beam 1 is also supported vertically by a pair of floor beam support struts 11 which are joined to a corresponding pair of clevis fittings 12 which extend down from the lower flange 6. Additionally, a number of seat rails 13, which extend parallel to the longitudinal axis of the fuselage, are attached to the upper flanges 4 of the floor beams 1.

The seat rails, along with cabin items, such as passengers, monuments, partitions etc carried by the fuselage floor, exert a loading (down, up, longitudinal and lateral) on the upper flanges 4 of the floor beams 1. The floor beam support struts 11 exert a relatively concentrated upward vertical reaction load on the lower flanges 6 via the clevis fittings 12. The regions of the shear web 2 adjacent the fittings 12 are particularly critical areas of the beams 1 as they need to support the concentrated shear loads exerted by the floor beam support struts 11.

To avoid extreme local bending of the lower flange 6, the shear web 2 is locally reinforced with extra stiffeners around the fittings 12 (or alternatively by locally thickening the shear web 2). This local reinforcement also ensures a gradual shearing of the concentrated vertical load into the beam. However, the extra reinforcement adds significant weight to the design.

As the aircraft fuselage can contain upwards of 60 of these floor beams, any reduction in the weight of an individual beam 1 can lead to significant overall weight savings.

Optimisation of the conventional floor beam design is typically performed by varying the width/thickness of the upper/lower flanges, by varying the width/thickness of the vertical stiffeners and by varying the thickness of the shear web. The number of vertical stiffeners and the distance between them, as well as the size and shape of the cut-outs 8 can also be varied.

SUMMARY OF THE INVENTION

A first aspect of the invention provides a beam comprising first and second flanges, the beam having a first region extending between the flanges and a second region extending between the flanges, the first region being designed to support an applied concentrated shear load and the second region being designed to support a predominantly bending load, wherein the first region comprises a fan-shaped truss comprising a hub adjacent the first flange and a plurality of struts which extend substantially radially from the hub, and wherein the second region comprises either a truss structure which is substantially regular in the longitudinal beam direction or a shear web.

Preferably, the fan-shaped truss further comprises a plurality of cut-outs which collectively form a substantially semi-circular array. The fan-shaped truss of the first region is a weight-optimised structure for supporting relatively concentrated loads. Therefore, by employing fan-shaped trusses in place of less optimised structural configurations which are subject to relatively concentrated loads, significant weight savings can be achieved.

In the case where the second region is a shear web, the shear web may have no cut-outs. More preferably, the shear web comprises one or, even more preferably, a plurality of cut-outs. When the shear web comprises a plurality of cut-outs, stiffeners are preferably disposed between the cut-outs.

Where stiffeners are disposed between the cut-outs, the distance between adjacent stiffeners may be constant but more preferably the distance between adjacent stiffeners varies in the longitudinal beam direction. In this case, there is less distance between the stiffeners where more beam strength is required, and more distance between the stiffeners where less beam strength is required. Additionally or alternatively, the height (i.e. the dimension extending out of the plane of the web), width (i.e. the transverse dimension) and/or thickness of the stiffeners may be increased to further increase the strength of the beam where required.

The thickness (i.e. the dimension perpendicular to the plane of the web) of the shear web also preferably varies in the longitudinal beam direction in order to increase the amount of load it can support where necessary.

The shear web (with or without cut-outs) is typically easier to manufacture than a truss structure. For example but not exclusively the shear web can be formed from an extruded profile and the cut-outs can be machined or formed using a laser cutter.

In the case where the second region comprises a truss structure which is substantially regular in the longitudinal beam direction it is preferable that the truss structure comprises a series of truss struts extending between the first and second flanges in a substantially triangular pattern.

Preferably one or more of the truss struts are provided with a central spine which extends along its length and protrudes out from the front (or rear) of the strut to form a T-shaped cross section. Alternatively, the central spine may protrude out from both the front and rear of the strut to form a cruciform-shaped cross section. This helps to stiffen the truss struts against in plane and/or out of plane bending.

In some instances, a truss structure may be heavier than a shear web. However, in this case, the beam as a whole may still be lighter in weight when the second region is a truss structure than if the second region comprises a shear web. This is because less material may be required to interface a truss structure with the first region than to interface a shear web with the first region.

In other instances, a truss structure may be lighter than a shear web. In this case, the benefits of both lighter weight interfacing and a lighter second region can be achieved.

At least one of the struts of the fan-shaped truss is preferably, but not necessarily, stiffened against in plane bending and/or out of plane bending. More preferably, all of the struts of the fan-shaped truss are stiffened against in plane bending and/or out of plane bending. For example, each strut may be provided with a central spine which extends along its length and protrudes out from the front (or rear) of the strut to form a T-shaped cross section. Alternatively, the central spine may protrude out from both the front and rear of the strut to form a cruciform-shaped cross section.

Preferably, the first and/or second flanges have widths (i.e. the dimension perpendicular to the plane of the web/truss structure) and/or thicknesses (i.e. the dimension parallel to the shortest line extending between the first and second flanges) which vary along the longitudinal direction of the beam. For example, one or both of the flanges may be thickened locally at load introduction points and/or widened where it is necessary to fasten another component to the flange.

Additionally or alternatively, one or both of the flanges may be thickened and/or widened to increase their bending stiffness at particular points along their lengths.

Additionally or alternatively, one or both of the flanges may be thickened and/or widened in order to increase the overall bending stiffness of the beam in order to balance a variable bending moment. This reduces stress and increases the strength of the beam in the thickened and/or widened areas.

Additionally or alternatively, the overall height (i.e. the distance between the outer surfaces of the two flanges) and/or depth of the beam (i.e. the distance between the front and rear of the beam) may be tailored to control the bending stiffness.

In a preferred embodiment, the second region is disposed between two first regions disposed at respective ends of the beam.

In another preferred embodiment, the second region is disposed between two first regions disposed at respective ends of the beam and the second region comprises a shear web (with or without cut-outs). In this case, the fan-shaped trusses of the two first regions provide a significant weight saving over existing beam designs such as that shown in FIG. 1, while the shear web provides a beam mid-section which is relatively simple to manufacture.

The beam may further comprise a fitting for connection to a support strut adapted to carry the concentrated shear load into the first region of the beam.

The first and/or second regions and/or one or both flanges may be formed (either completely or partly) from a metal such as aluminium or titanium. Additionally or alternatively, the first and/or second regions and/or one or both flanges may be formed (either completely or partly) from a composite material such as carbon fibre reinforced plastic (CFRP) or glass fibre reinforced plastic (GRP). As CFRP and GRP are relatively light materials, this leads to additional weight savings.

The beam may be formed as one integral part or from two or more components.

Where the beam is formed as one integral part, it may be formed from a block of material but more preferably the beam is formed from an extruded profile.

Where the beam is formed as one integral part, the beam may be machined during manufacture.

Where the beam is formed from two or more components, one or more of the components may be formed from a block of material or more preferably from an extruded profile.

Where the beam is formed from two or more components, one or more components of the beam may be machined during manufacture.

Where the beam comprises stiffeners, it is particularly preferable for the stiffeners to be formed from an extruded profile to maximise their strength and minimise the height of the stiffened shear web (i.e. the dimension perpendicular to the plane of the web). Additionally or alternatively, any truss struts which have a T or cruciform cross-section (for example in the fan truss struts of the first region and/or if the second region comprises a truss structure, in the truss struts of the second region) are preferably formed from an extruded profile for similar reasons.

Where the beam manufacturing process involves machining an extruded profile, machining costs are reduced as the extruded net profile is closer to the final section of the beam.

The beam according to the first aspect of the invention preferably has a length and a height and the aspect ratio of the length to the height is preferably at least 5, and more preferably the aspect ratio is at least 10.

The shortest distance between the first and second flanges is preferably greater at the first region than at the second region. This allows bundles of system lines to be compactly attached to the underside of the second region of the beam.

The beam may be a floor beam, for example of an aircraft fuselage.

The beam may be an I-beam in which case the flanges overhang the web/truss structure to its front and to its rear. Alternatively the beam may be a C-beam wherein the flanges overhang the web/truss structure to either its front or its rear but not both.

A second aspect of the invention provides a joint comprising a component joined to the beam according to the first aspect of the invention. The joint may, for example but not exclusively, comprise a support strut joined to one of the beam flanges adjacent the first region.

A third aspect of the invention provides an aircraft comprising the beam according to the first aspect of the invention or the joint according to the second aspect of the invention.

BRIEF DESCRIPTION OF THE DRAWINGS

Embodiments of the invention will now be described with reference to the accompanying drawings, in which:

FIG. 1 is a schematic view of a conventional fuselage floor beam design;

FIG. 2 is a schematic perspective view of a fuselage cross-section showing the attachment of the floor beam of FIG. 1 to the fuselage;

FIG. 5 shows a close-up of one of the fan-shaped trusses of FIG. 3, with an upper flange which has a varying width along its length;

FIG. 6 shows the floor beam of FIG. 3 with an alternative mid-section comprising a regularly spaced series of cut-outs; and FIG. 7 shows the floor beam of FIG. 6 where the height of the mid-section is substantially the same as the height of the end regions.

DETAILED DESCRIPTION OF EMBODIMENT(S)

Figure 3:
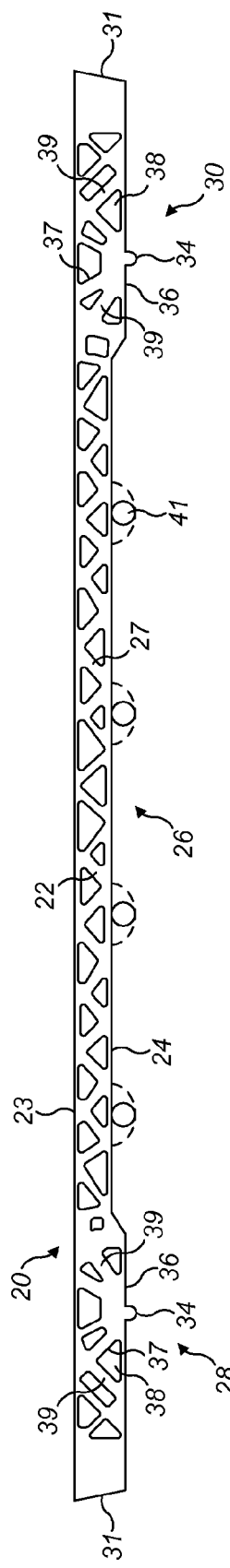
FIG. 3 is a schematic view of an fuselage floor beam design which has regular truss structure between two fan-shaped trusses where the regular truss structure has a reduced height to allow systems lines to be compactly attached to its underside.

FIG. 3 is a schematic view of an I-beam 20 for an aircraft fuselage floor, the beam 20 comprising upper and lower flanges 23, 24. The beam 20 has a mid-section 26 extending lengthwise between two end regions 28, 30. The mid-section 26 has a substantially regular truss structure comprising a number of truss struts 27 which extend between the upper and lower flanges 23, 24 in a substantially regular triangular pattern in the longitudinal beam direction. The end regions each comprise a fan-shaped truss having a substantially semi-circular hub 36, which is integrally formed with the inside face of the lower flange 24, and six fan truss struts 37 which extend substantially radially from the hub 36. As shown in FIG. 5, each strut 37 may be provided with a central spine 37a which extends along its length and protrudes out from the front (or rear) of the strut to form a T-shaped cross section. Alternatively, the central spine may protrude out from both the front and rear of the strut to form a cruciform-shaped cross section. In both cases, the central spines stiffen the struts 37 against in-plane and out of plane bending. Similarly, the truss struts 27 may also have central spines (not shown) which extend along their length and protrude from their front and/or rear to form T- or cruciform shaped cross sections. Again, the central spines stiffen the truss struts 27 against in-plane and out of plane bending.

Each fan-shaped truss further comprises five cut-outs 38 which are disposed between the fan truss struts 37 to collectively form a substantially semi-circular array about the hub 36. The fan truss struts 37 are integrally formed with neighbouring struts 39 which extend between the upper and lower flanges 23, 24.

Figure 4:
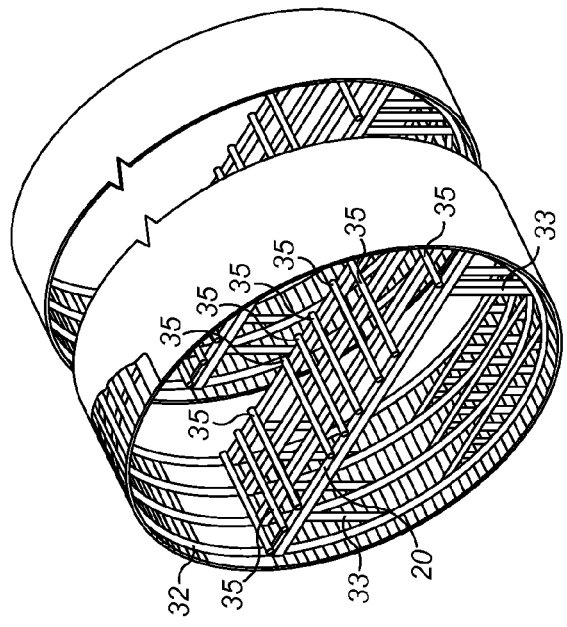
FIG. 4 is a schematic perspective view of a fuselage cross-section showing the attachment of the floor beam of FIG. 3 to the fuselage.

As shown schematically in FIG. 4 ("Airframe Structural Design", by Michael C. Y. Niu, $2^{nd}$ Edition, Hong Kong Conmilit Press Ltd.), a number of these floor beams 20 extend across the width of an aircraft fuselage to support a fuselage floor. The end faces 31 of each of the beams 20 are attached to the inside face of a respective fuselage frame 32. The beams 20 are also each supported by a pair of floor beam support struts 33 which are joined to the beams 20 via a corresponding pair of clevis fittings 34 which extend down from the lower flange 24 at the respective end regions 28, 30. A number of seat rails 35, which extend parallel to the longitudinal axis of the fuselage, are attached to the upper flanges 23 of the floor beams 20.

A downward vertical load is applied to the upper flanges 23 of the floor beams 20 by the seat rails 35 and by any cabin item, e.g. passengers and cabin crew (not shown) carried by the fuselage floor. The floor beam support struts 33 exert a relatively concentrated upward vertical reaction load on the lower flanges 24. Because the beams 20 are slender (i.e. the aspect ratio of the length of the beam to the height of the beam is at least 5, the height of the beam being defined as the shortest distance between the outer surfaces of the upper and lower flanges 23, 24), and because the relatively concentrated loads are applied at the end regions 28, 30 of the beam 20, the mid-section 26 supports a predominantly in-plane bending load. However, due to the reaction loads exerted on the end regions 28, 30 by the floor beam support struts 33, the end regions 28, 30 support a predominantly applied concentrated shear load.

The mid-section 26 is specifically designed to support this type of load. In particular, the substantially regular truss structure of the mid-section 26 is able to support a substantially constant load at each point along its length. However, it is noted that the truss structure is not completely regular. As the beam is carried by the support struts 33 at the end regions 28, 30, the shear loads supported by the mid-section 26 are greater towards the end regions 28, 30 than towards the centre of the mid-section 26. Therefore, the beam is designed to be stronger towards the end regions 28, 30. This is done by increasing the pitch of the truss struts 27 relative to the flanges 23, 24 in these parts of the beam. Increasing the pitch of the struts 27 relative to the flanges 23, 24 leads to an increase in the number of struts 27 per unit length, thus locally increasing the strength of the beam 20.

The fan-shaped trusses of the end regions 28, 30 are specifically designed to support the concentrated shear load applied by the floor beam support struts attached to the fittings 34. The load applied by the floor beam support struts is channelled from the fittings 34 into the hubs 36 which provide local reinforcement adjacent the fittings 34. Load is then spread from the hubs 36 through the radial struts 37 towards the mid-section 26, the upper flange 23 and the fuselage frames 32 (via the end faces 31). By spreading the concentrated load along the length of the beam, a wider region of the beam is used to support the load. The non-regular arrangement of the fan-shaped trusses (relative to the neighbouring mid-section 26) is caused by the need for the struts 37 to be joined to the hub 36, which acts as a concentrated load introduction point, and also by the need for the struts 37 to spread the concentrated load over a wider region of the beam 20.

As shown most clearly in FIG. 5, the upper and lower flanges 23, 24 overhang the fan-shaped truss 28 to both the front and the rear. Additionally, the upper flange 23 has a width w and a thickness t which vary in the longitudinal beam direction. More specifically, the upper flange 23 is thickened and widened at the seat rail attachment points 40 where the seat rails 35 are fastened to the upper flange 23. It is necessary to thicken (and thereby strengthen) the upper flange 23 at these points as load is introduced to the upper flange 23 by the seat rails 35. Increasing the width of the flange 23 widens its overhanging portion which allows the seat rails 35 to be fastened to the flange 23 without having to pass fasteners through the fan-shaped truss.

The width and thickness of the lower flange 24 may also optionally be varied along its length. For example, the lower flange 24 may be narrower and thinner at both ends and tapered out towards a maximum width and thickness at the centre of the beam 20 in order to increase its bending stiffness. Varying these parameters helps to optimise the weight of the beam.

The height of the beam 20 (i.e. the shortest distance between the upper and lower flanges 23, 24) is greater at the end regions 28, 30 than at the mid-section 26. This enables bundles of systems lines 41 (shown schematically in FIG. 3) to be compactly attached to the underside of the mid-section 26 (e.g. by cable ties). This in turn avoids the need to pass the systems lines through the truss structure of the mid-section 26 which would be more complicated and time consuming during aircraft assembly and repair.

It will be understood that, although each fan-shaped truss is shown to have six fan truss struts 37 in FIG. 5, a greater or fewer number of struts may be employed. It will also be understood that, although the struts 37 shown in FIG. 5 are joined to neighbouring struts 39, the struts 37 may alternatively be directly joined to the upper flange 23. Additionally, the height of the beam at the mid-section 26 may alternatively be the same as the height of the beam at the end regions 28, 30. However, in this case, the systems lines would have to be passed through the voids between the truss struts 27 of the mid-section 26.

Modelling of this new design has shown that weight savings of approximately 5-10% are achievable over existing beam designs which employ locally reinforced shear webs at the end regions 28, 30. It has also been determined that the majority of the weight savings come from replacing these reinforced end regions with the fan-shaped trusses described above. More specifically, the fan-shaped trusses allow weight savings of approximately 15-20% to be achieved at the end regions. As an aircraft fuselage can contain upwards of 60 of these floor beams, this new beam design can achieve upwards of 60-80 kg in weight savings. This is of great benefit, particularly as fuel economy (and therefore weight saving) is currently a primary concern in aircraft design.

FIG. 6 shows an alternative beam 50 which shares some common features with the beam shown in FIG. 3. Identical features will be given the same reference numerals. The beam 50 comprises a shear web 52 extending between upper and lower flanges 23, 24. The web 52 comprises a mid-section 54 extending lengthwise between two end regions 28, 30. The end regions 28, 30 are identical to those described above with reference to FIG. 5. Again, the shortest distance between the upper and lower flanges 23, 24 is greater at the end regions 28, 30 than at the mid-section 74. However, it will be appreciated that this is not necessarily the case (see below).

The mid-section 54 comprises a shear web with a regularly spaced series of identical oval weight-saving cut-outs 56. A number of stiffeners 58 are provided between the cut-outs 56. The stiffeners 58 have: a length which extends between the upper and lower flanges 23, 24; a width in the transverse direction of the stiffener; and a height in the dimension perpendicular to the plane of the web 52.

As above, the mid-section 54 is designed to enable it to support the predominantly bending load to which it is subjected when in use. However, it is noted that the structure of the mid-section is not completely regular. As indicated above, there are regions of the mid-section 54 which need to be stronger than others. In particular, the mid-section 54 needs to be strengthened towards the end regions 28, 30 compared to the centre of the beam. Additionally, the mid-section may also be strengthened adjacent the seat rail attachment points 40 on the upper flange 23. In order to provide this additional strength where required:
- the thickness of the shear web 72 (i.e. in the dimension perpendicular to the plane of the web) may be locally increased;
- the thicknesses, heights and/or widths of the stiffeners 78 may be increased; and/or
- the distances between adjacent stiffeners 78 may be reduced.

As before, the end regions 28, 30 are designed to support the relatively concentrated shear load applied by the floor beam support struts.

The shear web mid-section 54 and the trussed mid-section 26 described above are typically similar in weight (i.e. +/−1%) but this is dependent on the particular geometry and loading requirements of the beam. For the particular loading and beam geometries considered here (shown in FIGS. 3 and 6), the shear web mid-section 54 has been shown to be around 1% lighter in weight than the trussed mid-section 26.

In order to determine the weight of the beam as a whole, the interface between the mid-sections and the fan-shaped trusses of the end regions 28, 30 must also be considered. In particular, more material is required at the interface between the mid-section 54 and the fan-shaped trusses at the end regions 28, 30 compared with the interface between the end regions and trussed mid-section 26 shown in FIG. 3. For the particular beam geometries considered here, this results in the beam 50 being slightly heavier (by less than approximately 1%) overall than the beam 20 shown in FIG. 3 despite the shear web mid-section 54 being lighter in weight than the trussed mid-section 26. However, it is noted that the shear web mid-section 54 is easier to manufacture than the trussed mid-section 26 of the beam 20 which, in practical terms, can make the beam 50 a more attractive design.

It will be understood that the shear web of the mid-section 54 may comprise any number of cut-outs 56 or alternatively may not necessarily comprise any cut-outs 56.

FIG. 7 shows another alternative beam 70 which shares common features with the beam 50 described above. The same reference numerals will be used for identical features. In this case, the mid-section 74 of the beam 70 has a height which is substantially the same as the height of the end regions 28, 30. The disadvantage of the beam 70 compared with the beam 50 is that, in this embodiment, systems cables need to be passed through the cut-outs 76 in the mid-section 74. This is more complicated and time consuming during aircraft manufacture than attaching the cables to the underside of the mid-section 54 as described above. Moreover, it requires the beam 70 to have cut-outs 76.

The beams 20, 50, 70 described above are typically formed from a metal such as aluminium (e.g. machined from an extruded aluminium profile). However, the beams 20, 50, 70 may alternatively be made from a composite material, such as carbon fibre reinforced plastic (CFRP).

Although in the embodiments described above, the floor beam support struts are attached to the beams by clevis fittings 34, it will be understood that they may be attached directly to the lower flange 24 or even directly to the hubs 36 of the fan-shaped trusses.

It will be understood that, although the beams 20, 50, 70 have all been described as having I-sections, they could alternatively have other sections such as a C-section.

It will also be understood that, although the beams 20, 50, 70 are described as being supported by two vertical support struts, only one vertical support strut may be employed. For example, only one support strut may be employed at beams near the cargo doors (not shown) of the aircraft where there is insufficient space for two struts. In this case, only one fan-shaped truss is required and the beam is unsymmetrical.

It is also noted that the arrangement of the seat rails on the beams 20, 50, 70 may be unsymmetrical. For beam 20, this may also lead to an unsymmetrical variation in the pitch of the truss struts 27 of the mid-section 26. For beams 50, 70 this may lead to an unsymmetrical variation in the size/distance between cut-outs (or indeed an unsymmetrical variation in the height/thickness/width of the stiffeners or the thickness of the shear web) at the mid-sections 54, 74 respectively. However, in both cases, the structure of the mid-section remains substantially regular in the longitudinal beam direction.

As well as being useful for beams on aircraft, similar designs to those described above may be used on other structures (such as cranes and bridges).

Although the invention has been described above with reference to one or more preferred embodiments, it will be appreciated that various changes or modifications may be made without departing from the scope of the invention as defined in the appended claims.

The invention claimed is:

1. A beam comprising first and second flanges, the beam having a first region extending between the flanges and a second region extending between the flanges, the first region including a fitting configured to receive an applied concentrated shear load, and the second region being designed to support a predominantly bending load, wherein the first region comprises a fan-shaped truss comprising a hub adjacent the first flange and a plurality of struts which extend substantially radially from the hub, and wherein the hub is aligned in a vertical direction with the fitting and the second region comprises either a truss structure which is substantially regular in the longitudinal beam direction or a shear web.

2. The beam of claim 1 wherein the fan-shaped truss further comprises a plurality of cut-outs which collectively form a substantially semi-circular array.

3. The beam of claim 1 wherein the second region comprises a shear web having a plurality of cut-outs.

4. The beam of claim 3 further comprising stiffeners disposed between the cut-outs.

5. The beam of claim 1 wherein the second region comprises a shear web with a thickness which varies in the longitudinal beam direction.

6. The beam of claim 1 wherein the second region comprises a truss structure having a series of truss struts extending between the first and second flanges in a substantially triangular pattern.

7. The beam of claim 1 wherein the first and/or second flanges have widths which vary in the longitudinal direction of the beam.

8. The beam of claim 1 wherein the second region is disposed between two first regions disposed at respective ends of the beam.

9. The beam of claim 1 wherein the first and/or second regions and/or one or both flanges are substantially formed from a composite material.

10. The beam of claim 1 wherein the beam has a length and a height and the aspect ratio of the length to the height is at least 5.

11. The beam of claim 1 wherein the shortest distance between the first and second flanges is greater at the first region than at the second region.

12. The beam of claim 1 wherein the beam is a floor beam.

13. The beam of claim 12 wherein the floor beam is in an aircraft fuselage.

14. The beam of claim 1 wherein the beam is an I-beam.

15. A joint comprising a component joined to the beam of claim 1.

16. An aircraft comprising the structural beam of claim 1.

17. A beam comprising:
first and second flanges and a mid-section between the flanges;
a fan shaped truss in a first end region of the beam, wherein the fan shaped truss is in the mid-section and includes a hub proximate the first flange and a plurality of struts extending from the hub towards the second flange,
a fitting aligned in a vertical direction with the hub and configured to receive a concentrated shear load; and
a second region of the beam, away from an end of the beam, wherein the second region includes a truss structure or a shear web in the mid-section.

18. The beam of claim 17 wherein the beam is a floor beam in a fuselage of an airframe.

19. The beam of claim 17 wherein a number of struts per unit length of the beam in the fan shaped truss is greater than a number of struts or stiffeners per the unit length of the beam of the truss structure or shear web.

* * * * *